April 21, 1959

A. A. BUDNICK 2,882,799

METHOD OF AND MACHINE FOR MAKING GEARS

Filed July 23, 1953

INVENTOR
Arno August Budnick
By Walter Becker
Patent Agent

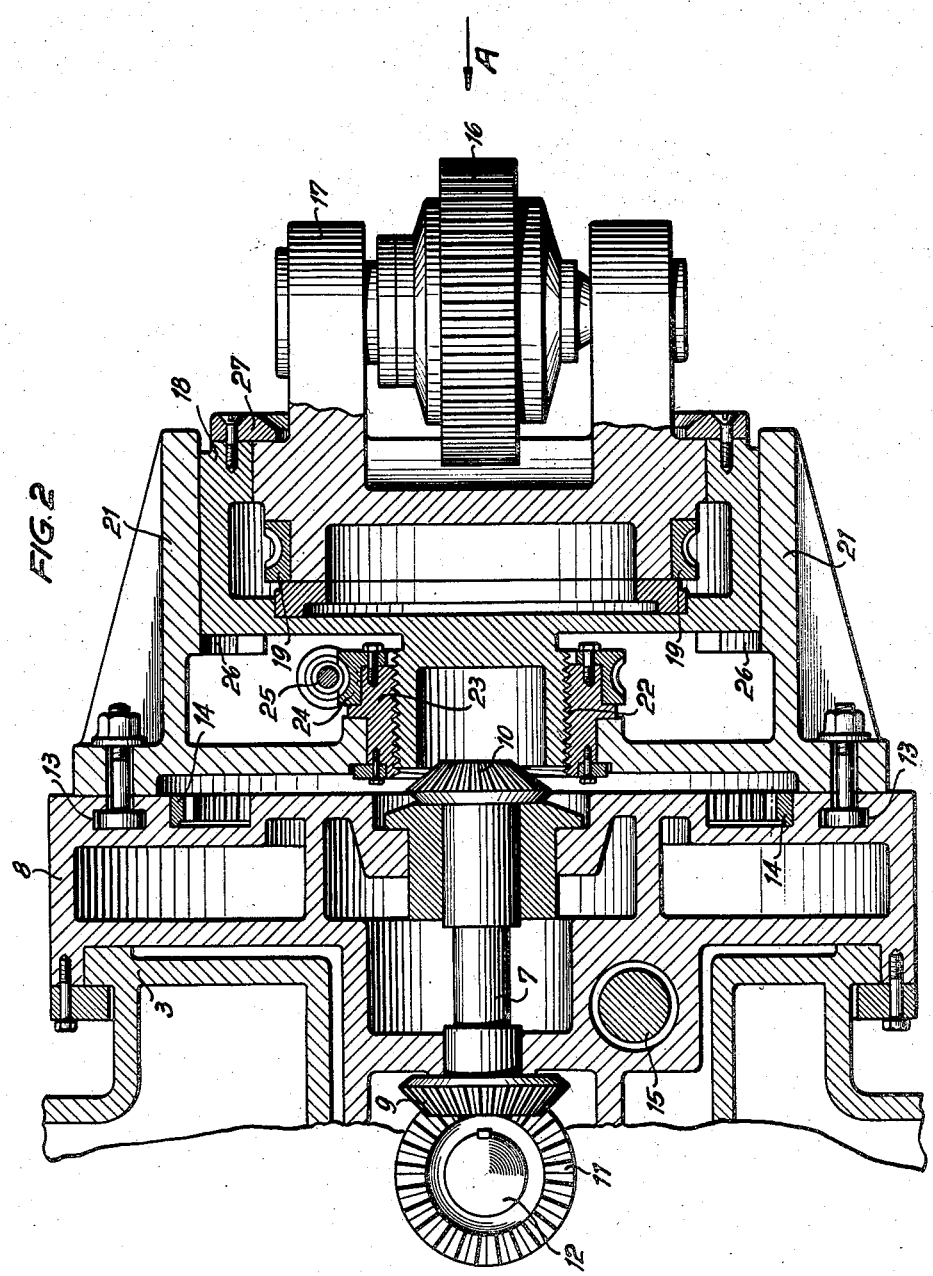

United States Patent Office 2,882,799
Patented Apr. 21, 1959

2,882,799

METHOD OF AND MACHINE FOR MAKING GEARS

Arno August Budnick, Dusseldorf, Germany, assignor to Schiess Aktiengesellschaft, Dusseldorf-Oberkassel, Germany Application July 23, 1953, Serial No. 369,801

Claims priority, application Germany July 26, 1952

5 Claims. (Cl. 90—1.6)

The present invention relates to the making of gears and, more specifically, concerns a method of and device for making gears.

In order to refine the profile of the teeth of gears, the so-called gear shaving which requires relatively little time is being employed to an ever increasing extent. According to the gear shaving method, the work-piece provided with teeth rotates together with the gear shaving wheel. The gear shaving wheel is similar to a gear with completely cut teeth. The said teeth correspond to those of the work piece to be machined and the flanks of the teeth of said shaving wheel are grooved in order to form cutting edges.

Whereas, when providing wheels with teeth according to the rolling or hobbing method, the work-piece and the machining tool must be driven positively at a certain transmission ratio with regard to each other, when applying the gear shaving method, only one of the two parts, either the workpiece or the machining tool are driven so as to rotate the same. The magnitude of the feed or advance in depth and also the number of revolutions per minute at which the shaving tools work are within a range which is different from the range within which the gearing tools, especially hobs, work. The gear shaving, therefore, is carried out on special machines, the so-called gear shaving machines.

While the changing of the machines following the pre- or rough-cutting of the gears does not cause any particular difficulties with small work-pieces, such changing of the machines, however, is cumbersome and time-consuming when large gears of considerable weight are to be machined. This difficulty is furthermore increased when heavy and voluminous work-pieces are involved inasmuch as it is practically impossible to place such work-pieces on the second machine into precisely the same position which said work-pieces occupied on said first machine. Such misalignment may result in serious difficulties. Inasmuch as the machining tool, in view of the fact that its cutting edges have an unfavorable lip angle and are not undercut so that they are not free-cutting, can take off only very fine chips, it will be obvious that already a small misalignment of the work-piece on the second machine with regard to its position on the first machine, makes it necessary to take off from the work-piece a considerably high chip weight before a properly circular gearing will be obtained. This drawback will make itself particularly felt when large gears are involved such as those used in connection with the drives for ships. Aside from the considerable time required for the shaving operation in such an instance, in order to cut the material down by such fine chips, the wear produced thereby of the rather expensive shaving wheel is particularly disadvantageous.

It is, therefore, an object of this invention to provide an improved method of producing gears which will overcome the above-mentioned drawbacks.

It is another object of this invention to provide a method of producing gears which will make it possible to pre-cut and finish-cut the gears on one and the same machine, i.e. without transferring the gear from one machine to another machine.

Still another object of this invention consists in the provision of an improved machine which will make it possible, without changing the position of the work-piece with regard to the supporting member carrying the same, to pre-cut as well as to finish-cut the teeth into said work-piece.

These and other objects and advantages of the invention will appear more clearly from the following specification in connection with the accompanying drawings, in which:

Figure 2 shows on the left-hand side thereof a horizontal section through the column and slide displaceably mounted thereon, whereas the right-hand side of Fig. 2 represents a vertical section through the tool carrier for the tool carrying out the shaving operation.

*General arrangement*

The drawbacks of the heretofore known gear-cutting methods have been overcome according to the present invention by cutting the teeth into the work-piece first according to the rolling or hobbing method and subsequently by shaving the teeth on the same machine without changing the position of the work-piece relative to the means supporting the same. Preferably, this is being done in such a manner that the milling cutter, after having performed its milling operation, is replaced by a shaving tool, whereupon the work-piece carrier is driven faster during the shaving operation than it was driven during the milling operation.

The machine for carrying out the new method is characterized primarily in that the carriage supporting the milling tool is at least in part exchangeable for a carrier for the shaving tool. The carrier for the shaving tool is preferably provided with a device for controlling the feed or advance into depth of said shaving tool. Said carrier may also be provided with a device for angularly adjusting the shaving tool relative to the work-piece. According to a particularly advantageous embodiment of the invention, the working tool carriage of the machine is provided with a plate to which may exchangeably be connected a casing in which a slide is longitudinally adjustably mounted, while said slide has rotatably journalled therein a bearing member for the shaving tool.

According to a further development of the invention, the work-piece carrier, in addition to having a drive for purposes of hobbing, is also provided with a second drive, preferably a spur gear drive, for shaving, which last-mentioned drive allows higher speeds of rotation than are required for hobbing.

*Structural arrangement*

Figure 1:
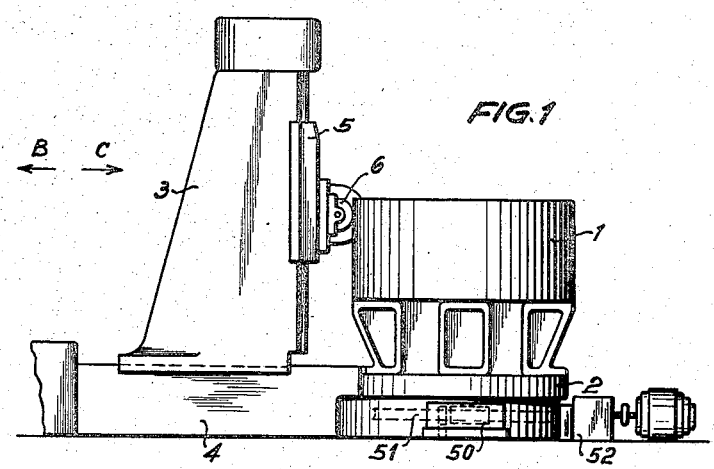
Figure 1 illustrates a diagrammatic side view of a machine according to the invention with the work-piece vertically resting on the chuck.

Referring now to the drawings in detail, and Fig. 1 thereof in particular, it will be seen that the work-piece 1 is carried by the revolving table 2. Mounted on the bed 4 is a column 3 which is adjustable in the direction of the arrows B and C. The machining tool carrier or carriage with the machining tool 6 is arranged on the column 3 in such a manner that it can be moved upwardly and downwardly along vertical guiding surfaces of said column.

In order to produce the teeth on the work-piece according to the hobbing method, the table 2 is driven in customary manner at low speeds, for instance, by means of a worm 50 and worm-wheel 51, while the machining tool carriage 5, similar to all hobbing machines, is driven through a vertical threaded spindle 15 (Fig. 2) which is arranged in the column 3. As machining tool, a hob 6 is used which is driven in customary manner from shaft 12 in column 3 through the intervention of bevel gears 11 and 9 and shaft 7 journalled in column 3.

So far, the machine is similar to the customary hobbing machines. According to the present invention, the same machine is also used for shaving the pre-cut teeth of the work-piece without changing the position of said work-piece within said machine, in any way.

When carrying out the shaving method, only the work-piece 1 must be driven. According to the example shown in the drawings, only the work-piece 1, i.e. the revolving table 2, is being driven. Inasmuch as the shaving is carried out considerably quicker than the milling, a second drive for the table is provided, preferably a spur gear drive or a worm-wheel drive 52 with sufficiently great division (not particularly illustrated). Large hobbing machines are frequently provided with two table drives one of which is sometimes designed as a spur gear drive. Such second drive is intended in connection with the placing of the work-piece into the chuck and for verifying the centricity of the chucked work-piece. Moreover, said second drive is so dimensioned that the table may carry out up to five revolutions per minute. Such speed, however, is not sufficient for the purpose involved in the present case, rather, a multiple of such speed is necessary. In order to be able to carry out a clean shaving operation, for which purpose a fine feed or advance of the shaving tool and also an easy adjustability of the crossing angle of the shaving tool axis with the work-piece axis is necessary, the machining tool carriage 5 is exchangeably arranged. Therefore, a machining tool carriage is provided which comprises the driving and receiving elements for a hob and furthermore there is provided a second machining tool carriage with all devices which are advantageous and necessary for gear shaving but not needed for hobbing. When changing from hobbing or milling to shaving, only the first carriage has to be exchanged for the second carriage without the changing of the position of the work-piece on table 2. In order to facilitate the exchange of the carriages, the arrangement may be such that only the upper portion of the carriage with the machining tool is to be exchanged. Such an arrangement is illustrated in Fig. 2.

With reference to Fig. 2, plate 8 of the carriage serves both purposes. For this reason, the plate 8 carries the driving eleemnts for the hob in form of a shaft 7 with the two bevel gears 9 and 10. As has been mentioned above, the bevel gear 9 is driven by the bevel gear 11 which is connected to the shaft 12 mounted in the column 3, whereas the bevel gear 10 conveys the driving moment to a transverse shaft journalled in the rotatable part of the carriage for the hob. Said transverse shaft then conveys the driving moment to the mandrel for the hob or miller for instance, through a spur gear drive. The groove 13 which is concentric to shaft 7 and is provided in the plate 8 serves for receiving and guiding the rotatable part, whereas the gear ring 14 serves for purposes of adjusting said rotatable part. Such devices are well known for the adjustment and the drive of a hob and are employed in various designs. Therefore, they have been illustrated only to such an extent as they are present with the illustrated embodiment after that part of the carriage has been installed which serves for shaving purposes.

By means of the threaded spindle 15 journalled in column 3, plate 8 can be displaced along column 3 in vertical direction. The spindle 15 is automatically and uniformly driven with the milling operation as well as with the shaving operation.

Figure 3:
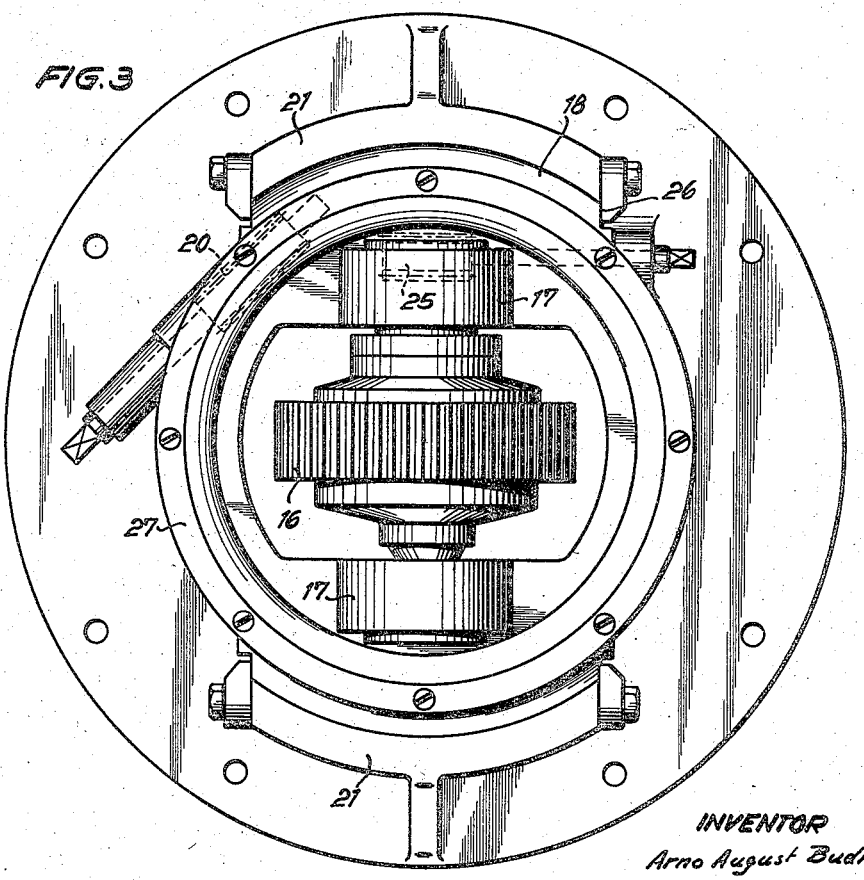
Figure 3 is a front view of the work-piece carrier when looking in the direction of the arrow A of Figure 2.

Figures 2 and 3 illustrate the shaving device which has been substituted for the rotatable part with the milling support and which has been mounted on plate 8.

The casing 21 which is connected to plate 8 by means of connecting screws (not shown in the drawing) has its interior provided with guiding means 26 for a reciprocable carriage 18, which is driven by a worm 25 journalled in casing 21 through the intervention of the worm-wheel 24 and nut 23 connected thereto. Rotation of the nut 23 causes the threaded stud 22 of the slide or carriage 18 to move forwardly or backwardly in order thereby to adjust the shaving tool properly with regard to the work-piece. In this manner, adjustments by, for instance, 0.05 mm. can be effected, which adjustments could not be effected to such fine extent with the large and heavy column 3 (Fig. 1).

The carriage 18 has easily rotatably journalled therein a bearing block 17 for supporting the axle of the shaving gear 16. Toward the outside, said bearing block 17 is secured by a holding ring 27. The bearing block 17 is adapted to be rotated by means of the worm 20 (Fig. 3) journalled in carriage 18. Worm 20 meshes with worm-wheel 19 arranged adjacent the circumference of the bearing block 17, so that the shaving tool 16 by means of the movement of the worm 20 may be rotated parallel to the annular groove 13 or may be placed into alignment therewith, in order to bring the gearing of the shaving tool 16 into proper position with regard to the pre-cut work-piece. After the machine following the exchange of the parts of the carriage 5 and the insertion of exchange parts in the manner illustrated in Figs. 2 and 3, has been adjusted for gear-shaving, the table drive for hobbing, for instance, by withdrawing the dividing worm—if the work-piece table is provided with a worm ring for hobbing—is made ineffective, whereas the drive intended for gear shaving is made effective. The work-piece itself, due to its gearing, will rotate the shaving wheel 16. By driving the spindle 15, the plate 8 and thus the shaving wheel 16 is moved over the width of the work-piece 1. Thereupon, the carriage 18 and thus the bearing block 17 with shaving wheel 16 is somewhat advanced toward the work-piece, whereupon the direction of rotation of the spindle 15 and the table 2 with the work-piece 1 is reversed so that the shaving wheel 16 moves in reverse direction over the width of the work-piece, etc. until the gearing of the work-piece has the desired surface quality. This process is known per se.

Instead of the described machine elements, also other elements may be used which are adapted to serve the same purpose. Thus, for instance, the thread 22 and nut 23 may be replaced by a key-sliding gear. Also, the division of the carriage 5 into an exchangeable part and into a part employed with both working steps may be arranged at points different from those in Figs. 2 and 3. Thus, for instance, the rotatable part (not shown in the drawing) used for milling, which part is rotatable about the axis of shaft 7 by means of the gear ring 14 may be used for adjusting the shaving wheel 16. In such an instance, the worm wheel 19 and worm 20 would be superfluous, and the parts 17 and 18 could be rigidly connected to each other, or could be made of one single piece, whereby they could be handled more easily. Also, the casing 21 would be reduced in size in a corresponding manner and would then be screwed to the support for the miller instead of being screwed to the bearing for the mandrel for the milling cutter. In such instance, the shaving wheel 16 would be located somewhat farther away from column 3 than the hobbing tool, however, this is immaterial inasmuch as its cutting work is considerably less than that of the hobbing tool. Also, such an arrangement will make possible fine feeding steps of the shaving wheel 16.

According to the present invention, the work-pieces, as indicated above, can be provided with teeth by means of a hob and can subsequently have their teeth shaved by means of a shaving wheel while the work-piece remains in one and the same chucked position. The shaving tool therefore starts working on a circularly moving gear and has to perform a small shaving work only in order to rectify local faults in the gearing of the work-piece and to improve the surface of the tooth flanks. In this way, the shaving work is reduced to a minimum and the expensive shaving tool is saved from excessive wear. Furthermore, a great saving in time is obtained in view of the fact that a transfer of heavy work-pieces from one machine to another machine, is avoided. Finally, the costs and the place for a second machine, namely, a shaving machine, are saved.

It is, of course, understood that the present invention is, by no means, limited to the particular method and arrangement described in the foregoing specification, but also comprises any modifications within the scope of the appended claims.

What I claim is:

1. A machine for making gears which comprises in combination: a column, a carriage supported by said column and movable relative thereto, said carriage being adapted to receive and support a milling tool, supporting means adapted to receive and support a shaving tool, said supporting means being exchangeable with at least a portion of said carriage, means carried by said supporting means for feeding said shaving tool toward a work-piece to be provided with gears, a rotatable workpiece support, first driving means operatively connected to said workpiece support for rotating the same at a predetermined speed suitable for precutting teeth into said workpiece by said milling tool, and second driving means operatively connected to said workpiece support and adapted to drive said workpiece at a speed higher than said predetermined speed suitable for shaving precut teeth of said workpiece.

2. A machine for providing a work-piece with teeth, which comprises in combination: a column, a carriage supported by said column and movable relative thereto, said carriage being adapted to receive and support a milling tool, supporting means adapted to receive and support a shaving tool, said supporting means being designed so as to be able to take the place of at least a portion of said carriage, adjusting means carried by with supporting means for angularly adjusting the shaving tool with regard to said work-piece, a rotatable workpiece support, first driving means operatively connected to said workpiece support for rotating the same at a predetermined speed suitable for precutting teeth into said workpiece by said milling tool, and second driving means operatively connected to said workpiece support and adapted to drive said workpiece at a speed higher than said predetermined speed suitable for shaving precut teeth of said workpiece.

3. A machine for providing a workpiece with teeth, which comprises in combination: a column, a carriage supported by said column and movable relative thereto, said carriage being adapted to receive and support a milling tool, supporting means adapted to receive and support a shaving tool, said supporting means being designed so as to be able to take the place of at least a portion of said carriage, a rotatable workpiece support for supporting a workpiece, first driving means operatively connected to said workpiece support for rotating the same at a predetermined speed suitable for precutting teeth into said workpiece by said milling tool, and second driving means operatively connected to said workpiece support and adapted to drive said workpiece at a speed higher than said predetermined speed suitable for shaving precut teeth of said workpiece.

4. A machine according to claim 3, in which said second driving means is designed as a spur gear drive.

5. A machine for making gears by successively performing a hobbing and a shaving operation, which comprises in combination: a column, a carriage supported by said column and movable relative thereto, said carriage being adapted to receive and support a milling tool, driving means extending through said column for driving said milling tool, supporting means adapted to receive and support a shaving tool freely rotatably supported by said supporting means, said supporting means being exchangeable with at least a portion of said carriage, a work piece supporting table, a first drive arranged for driving connection with said table for rotating the same at a first speed during said hobbing operation, and a second drive also drivingly connected with said supporting table and arranged for rotating the same at an increased speed within the range of standard shaving speeds during said shaving operation for rotating said shaving tool through the work piece on said supporting means when said work piece meshes with said shaving tool.

References Cited in the file of this patent

UNITED STATES PATENTS

| | | |
|---|---|---|
| 2,364,932 | Warner et al. | Dec. 12, 1944 |
| 2,433,468 | Mackmann et al. | Dec. 30, 1947 |
| 2,556,142 | McLeod | June 5, 1951 |
| 2,556,143 | McLeod | June 5, 1951 |
| 2,561,706 | Miller | July 24, 1951 |
| 2,749,802 | Carlsen | June 12, 1956 |